G. W. REDBURN.
CRANK FOR AUTOMOBILE ENGINES.
APPLICATION FILED MAY 9, 1912.
1,082,650.
Patented Dec. 30, 1913.
2 SHEETS—SHEET 1.
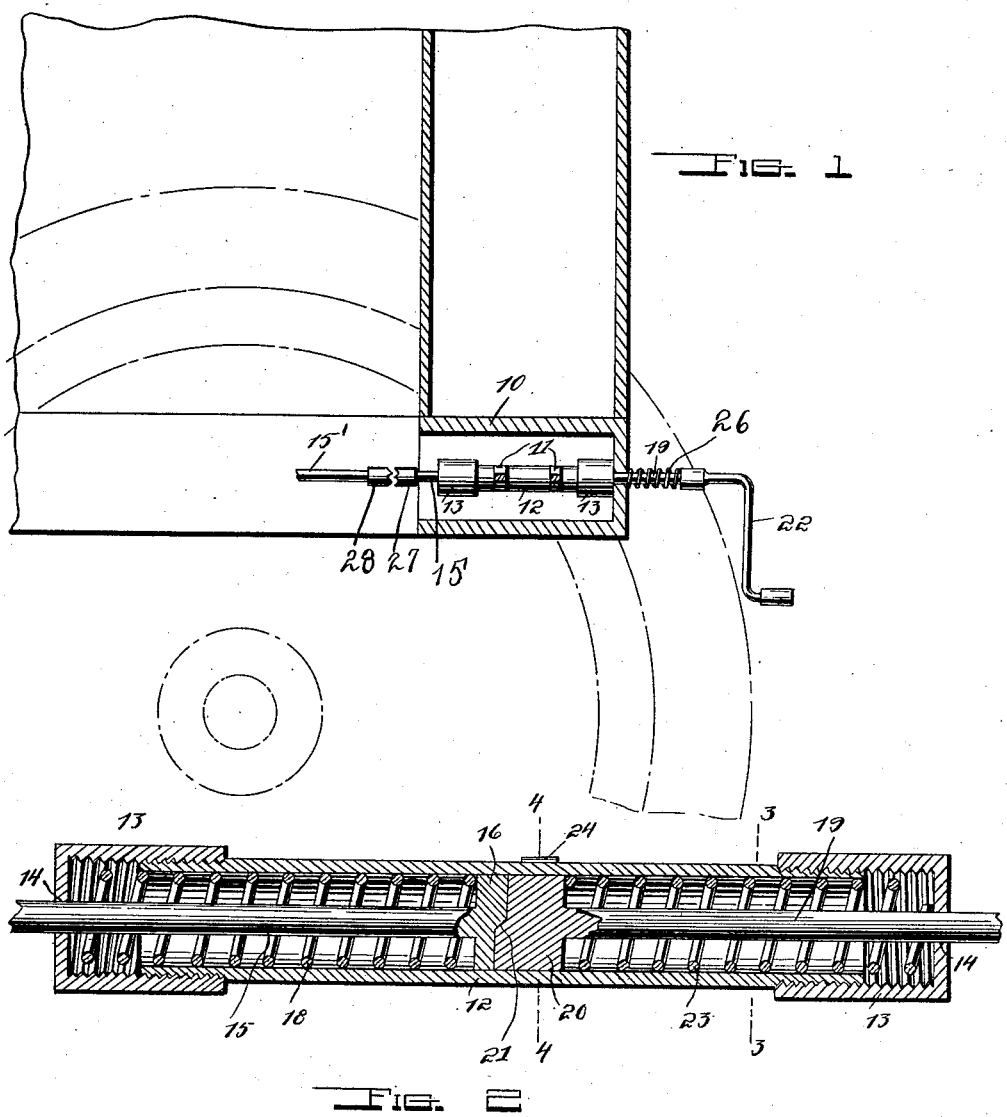
Witnesses
Frank S. Ratcliffe
Harry M. Test
Inventor
G. W. Redburn.
By 
Attorneys G. W. REDBURN.
CRANK FOR AUTOMOBILE ENGINES.
APPLICATION FILED MAY 9, 1912.
1,082,650.
Patented Dec. 30, 1913.
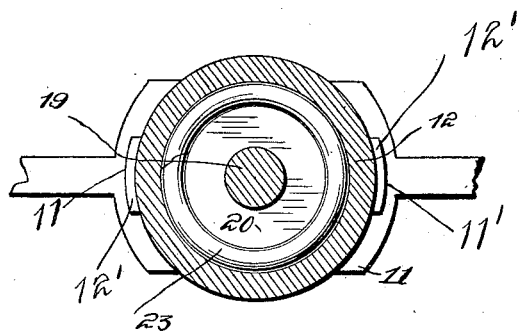
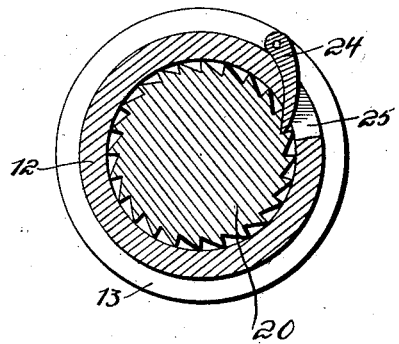
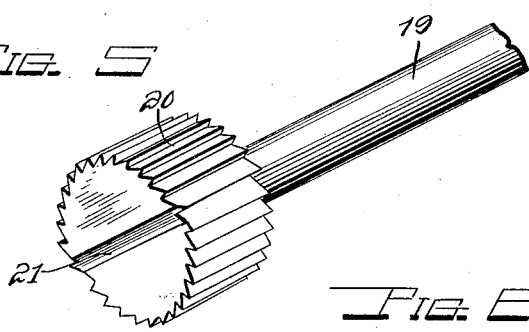
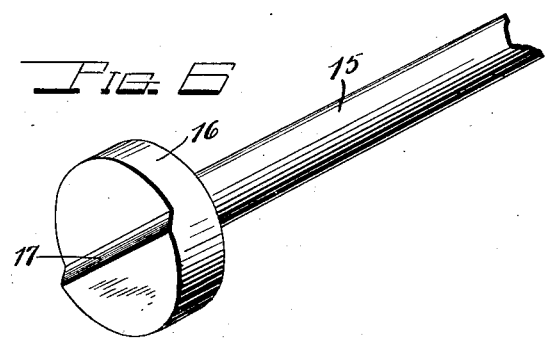

UNITED STATES PATENT OFFICE.

GEORGE W. REDBURN, OF COLLEGE PLACE, WASHINGTON.

CRANK FOR AUTOMOBILE-ENGINES.

1,082,650. Specification of Letters Patent. Patented Dec. 30, 1913.

Application filed May 9, 1912. Serial No. 696,183.

*To all whom it may concern:*

Be it known that I, GEORGE W. REDBURN, a citizen of the United States, residing at College Place, in the county of Walla Walla, State of Washington, have invented certain new and useful Improvements in Cranks for Automobile-Engines; and I do hereby declare the following to be a full, clear, and exact description of the invention, such as will enable others skilled in the art to which it appertains to make and use the same.

This invention relates to improvements in automobile engines, and has particular reference to a starting crank therefor.

The principal object of the present invention is to provide a hand crank of such construction that danger of injury to the operator when the engine back-fires is eliminated.

Another object of the invention is to provide a simple device of this character which is normally out of engagement with the engine shaft.

Other objects and advantages will be apparent from the following description and with particular reference to the accompanying drawings.

In the drawings: Figure 1 is a view of a portion of an automobile, partly broken away, showing my crank attached thereto, Fig. 2 is a vertical longitudinal sectional view through the cranking device, Fig. 3 is a vertical transverse sectional view on the line 3—3 of Fig. 2, Fig. 4 is a vertical transverse sectional view on the line 4—4 of Fig. 2, Fig. 5 is an enlarged detail view of the crank portion of the shaft, and Fig. 6 is a similar view of a portion of the engine shaft.

As it is well known, when cranking a gas engine, and particularly on automobiles, the engine often back-fires, and throws the crank handle against the operator's hand or arm with such force as to break the arm.

The principal object of this invention is to provide such a construction that the crank handle will remain stationary with respect to the engine shaft, whether the shaft rotates in a forward direction or backward.

Referring to the accompanying drawings 10 represents the forward portion of the chassis of the automobile, on which is mounted the brackets 11. Slidably mounted on these brackets, and extending longitudinally of the vehicle, is a tubular casing 12 in which is located my cranking device, to be later described. Each of the brackets is formed with the slots 11' for the reception of the lugs 12' on the sides of the casing 12. Each end of the casing is closed by means of a screw cap 13, having an opening formed centrally therein, as represented at 14. Projecting through the opening in the rear cap of the casing, and into the casing, is the forward portion of a short shaft section 15. On the forward portion of the shaft 15, and located within the casing is a head 16 formed with a clutch face 17 on its end. Surrounding the shaft and bearing with its opposite ends against the head and the said cap, is a strong coil spring 18, which holds the shaft portion yieldably against endwise movement.

Disposed within the casing, and projecting through the opening in the other cap, is the shaft portion 19 of the crank. On the inner end of the said portion 19 is a head 20, similar to the head 16, and also provided with a clutch face 21, for coöperative action with the shaft portion 15 to rotate the engine shaft. Secured on the outer end of the portion 19 is a crank handle 22. On the portion 19, and bearing with its opposite ends against the adjacent end cap and the head 20, is a coil spring 23, which holds the head 20 in engagement with the head 16, so that their clutch faces interlock. The head 20 is cylindrical and has ratchet teeth formed on its peripheral face, said teeth being engaged by the nose of a pawl 24, pivoted on the casing, and projecting thereinto, through the opening 25, in the side thereof. Thus the portion 19 may rotate forwardly, but is prevented from moving backwardly, so that when the crank is turned forwardly, and the engine back-fires, the backward rotation of the engine shaft will not move the portion 19, as the clutch face of the head 16 will slide back over the clutch face of the head 20. Thus the danger of the hand crank being thrown forcibly back against the hand or arm of the operator being eliminated.

From the foregoing it will readily be seen that the device is simple in construction, and effective in operation, and will obviate the usual dangers incident to back-firing, when cranking the engine.

The threaded portions of the caps and the ends of the casing are of such length that the caps may be screwed backwardly and forwardly to regulate the tensions of the springs 18 and 23.

On the portion 19 of the crank 22 is a spring 26 which engages with one end against the crank and with its other against the chassis 10, and holds the shaft portion 15 normally away from the engine shaft. The inner end of the shaft portion 15 carries a clutch head 27 for engagement with a similar head 28 on the forward end of the engine shaft 15'.

What is claimed is:

In a cranking device for an automobile gas engine, which engine includes a shaft, a casing, a shaft for detachable engagement with the engine shaft, a head on the said shaft and disposed within the casing, a crank shaft disposed in the casing, a head on the crank shaft, clutch faces on the heads for engagement with each other, a crank handle on the crank shaft, ratchet teeth on the head of the crank shaft, a pawl on the casing for engagement with the said teeth to prevent the backward rotation of the crank shaft, screw caps on the ends of the casing, springs in the casing and bearing against the caps and heads, and means for mounting the casing on the automobile.

In testimony whereof, I affix my signature, in presence of two witnesses.

GEORGE W. REDBURN.

Witnesses:
C. S. LANSING,
J. E. WOODS.

---

Copies of this patent may be obtained for five cents each, by addressing the "Commissioner of Patents, Washington, D. C."